United States Patent
Chaney et al.

(10) Patent No.: US 6,594,361 B1
(45) Date of Patent: *Jul. 15, 2003

(54) HIGH SPEED SIGNAL PROCESSING SMART CARD

(75) Inventors: John William Chaney, Noblesville, IN (US); Michael S. Deiss, Zionsville, IN (US); Billy W. Beyers, Greenfield, IN (US)

(73) Assignee: Thomson Licensing S.A., Boulogne-Cedex (FR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/792,816

(22) Filed: Jan. 30, 1997

Related U.S. Application Data

(63) Continuation of application No. 08/650,051, filed on May 16, 1996, now abandoned, which is a continuation of application No. 08/292,830, filed on Aug. 19, 1994, now abandoned.

(51) Int. Cl.[7] ............................................. H04N 7/167
(52) U.S. Cl. ........................................................ 380/221
(58) Field of Search ........................................... 380/10, 20

(56) References Cited

U.S. PATENT DOCUMENTS

| | | | | |
|---|---|---|---|---|
| 4,509,210 A | * | 4/1985 | Kohn | 455/349 |
| 4,599,647 A | * | 7/1986 | George et al. | 358/122 |
| 4,685,131 A | * | 8/1987 | Horne et al. | 380/20 |

(List continued on next page.)

FOREIGN PATENT DOCUMENTS

| | | | | |
|---|---|---|---|---|
| EP | 0428252 A3 | | 5/1991 | H04N/7/167 |
| EP | 0562295 A1 | * | 9/1993 | |
| EP | 0562295 | | 9/1993 | H04N/7/167 |
| EP | 0585833 A1 | | 3/1994 | H04N/7/167 |
| EP | 0588184 A1 | | 3/1994 | H04N/7/167 |
| GB | 2261580 A | | 5/1993 | H04N/7/16 |

OTHER PUBLICATIONS

International Standard, ISO 7816–1 "Identification Cards–Integrated Circuit(s) Cards with Contacts" Part 1: Physical characteristics.
International Standard, ISO 7816–2 "Identification Cards–Integrated Circuit(s) Cards with Contacts" Part 2: Dimensions and location of the contacts.
International Standard, ISO 7816–3 "Identification Cards–Integrated Circuit(s) Cards with Contacts" Part 3: Electronic signals and transmission protocols.

(List continued on next page.)

*Primary Examiner*—Thomas H Tarcza
*Assistant Examiner*—Christopher Revak
(74) *Attorney, Agent, or Firm*—J. S. Tripili; R. D. Shedd; D. T. Shoneman

(57) ABSTRACT

An access control system for signal processing applications includes an integrated circuit (IC) card, or "smart" card, that provides both security control and data descrambling functions. A security control processor in the smart card IC performs functions such as entitlement management and key generation. The smart card IC also includes a descrambler for processing data, such as video data, at high data rates. Mechanical characteristics of the smart card satisfy the ISO standard 7816-1. In addition, the interface to the smart card is via eight-terminals arranged on the surface of the card in accordance with ISO standard 7816-2. The eight terminal interface provides both high speed data I/O (input and output) required for data descrambling and ISO standard low speed serial data I/O.

12 Claims, 9 Drawing Sheets

U.S. PATENT DOCUMENTS

| | | | |
|---|---|---|---|
| 4,694,491 A | * | 9/1987 | Horne et al. .................. 380/20 |
| 4,739,510 A | * | 4/1988 | Jeffers et al. ................. 380/15 |
| 4,803,725 A | * | 2/1989 | Horne et al. .................. 380/44 |
| 4,816,653 A | | 3/1989 | Anderl et al. ............... 235/380 |
| 4,816,654 A | | 3/1989 | Anderl et al. ............... 235/380 |
| 4,829,569 A | * | 5/1989 | Seth-Smith et al. .......... 380/10 |
| 4,841,133 A | | 6/1989 | Gercekci et al. ............ 235/492 |
| 4,864,614 A | * | 9/1989 | Crowther ..................... 380/10 |
| 4,866,770 A | * | 9/1989 | Seth-Smith .................. 380/20 |
| 4,882,474 A | | 11/1989 | Anderl et al. ............... 235/380 |
| 4,887,296 A | * | 12/1989 | Horne ......................... 380/21 |
| 4,890,319 A | * | 12/1989 | Seth-Smith et al. ........... 380/5 |
| 4,890,321 A | * | 12/1989 | Seth-Smith et al. .......... 380/20 |
| 4,905,280 A | * | 2/1990 | Wiedener ..................... 380/16 |
| 4,908,834 A | * | 3/1990 | Wiedemer ...................... 380/5 |
| 4,937,866 A | * | 6/1990 | Crowther et al. ............. 380/20 |
| 4,993,066 A | | 2/1991 | Jenkins ........................ 380/16 |
| 5,029,207 A | * | 7/1991 | Gammie ...................... 380/10 |
| 5,034,597 A | | 7/1991 | Atsumi et al. ............... 235/380 |
| 5,036,537 A | * | 7/1991 | Jeffers et al. ................. 380/20 |
| 5,060,079 A | | 10/1991 | Rufus-Isaacs ............... 358/349 |
| 5,111,504 A | * | 5/1992 | Esserman et al. ............. 380/20 |
| 5,113,441 A | * | 5/1992 | Harada ........................ 380/15 |
| 5,120,939 A | | 6/1992 | Claus et al. ................. 235/382 |
| 5,144,664 A | * | 9/1992 | Esserman et al. ............. 380/20 |
| 5,149,945 A | | 9/1992 | Johnson et al. ............. 235/380 |
| 5,161,187 A | * | 11/1992 | Kajita et al. .................. 380/15 |
| 5,204,512 A | * | 4/1993 | Leki et al. ................... 235/382 |
| 5,224,161 A | * | 6/1993 | Daniel et al. ................. 380/14 |
| 5,237,610 A | * | 8/1993 | Gammie et al. .............. 380/10 |
| 5,267,312 A | * | 11/1993 | Thompson et al. ........... 380/19 |
| 5,272,751 A | * | 12/1993 | Kajita et al. .................. 380/17 |
| 5,282,249 A | * | 1/1994 | Cohen et al. ................. 380/23 |
| 5,339,402 A | | 8/1994 | Ueda .......................... 395/425 |
| 5,389,738 A | * | 2/1995 | Piosenka et al. ........... 174/52.4 |
| 5,410,599 A | * | 4/1995 | Crowley et al. ............... 380/9 |
| 5,426,701 A | | 6/1995 | Herrmann .................... 380/52 |
| 5,461,675 A | * | 10/1995 | Diehl et al. ................... 380/23 |
| 5,698,837 A | | 12/1997 | Furuta ....................... 235/492 |
| 5,736,728 A | | 4/1998 | Matsubara .................. 235/492 |
| 5,753,902 A | | 5/1998 | Fujioka ...................... 235/492 |

OTHER PUBLICATIONS

Article: Mercury One–2–One Creates Credit–card tie–in, Fletcher Jun. 13, 1994 Electronics.

EIA Standard for Contional Access, Ver.2.0 Draft Apr. 7, 1994 National Renewable Security Standards Committee.

European Scrambling Systems, Waterford Un.Press, '93, pp 7–1/7–15.

Satellite Book/ The VideoCrypt Encryption System, R.Crossley, '94 Ch.25,26.

* cited by examiner

| CONTACT NO. | ASSIGNMENT | CONTACT NO. | ASSIGNMENT |
|---|---|---|---|
| C1 | VCC (SUPPLY VOLTAGE) | C5 | GND (GROUND) |
| C2 | RST (RESET SIGNAL) | C6 | VPP (PROGRAMMING VOLTAGE) |
| C3 | CLK (CLOCK SIGNAL) | C7 | I/O (DATA INPUT/OUTPUT) |
| C4 | RESERVED TO ISO/IEC JTC 1/SC 17 FOR FUTURE USE | C8 | RESERVED TO ISO/IEC JTC 1/SC 17 FOR FUTURE USE |

HIGH SPEED SIGNAL PROCESSING SMART CARD

This application is a continuation of Ser. No. 08/650,051 filed May 16, 1996, abandoned, which is a continuation of Ser. No. 08/292,830 filed Aug. 19, 1994 abandoned.

The present invention involves access control systems including an integrated circuit (IC) card, or "smart" card, for limiting access to information in signal processing applications.

BACKGROUND

Systems such as pay-TV systems include access control sub-systems that limit access to certain programs or channels. Only users who are entitled (e.g., paid a fee) are permitted to view the programs. One approach to limiting access is to modify the signal by, for example, scrambling or encrypting the signal. Scrambling typically involves modifying the form of the signal using methods such as removing synchronization pulses. Encryption involves modifying a data component included in the signal according to a particular cryptographic algorithm. Only individuals who are entitled to access are given the "key" needed to descramble or decrypt the signal. The terms scrambling and descrambling as used below are intended to encompass access control techniques in general, including cryptography and scrambling.

Access control systems may include an integrated circuit (IC) card, or "smart" card, feature. A smart card is a plastic card the size of a credit card that has a signal processing IC embedded in the plastic. A smart card is inserted into a card reader that couples signals to and from the IC in the card. International Standards Organization (ISO) standard 7816 establishes specifications for an IC card interface. In particular, ISO standard 7816-2 specifies that the electrical interface to the card will be via eight contacts positioned on the card surface as shown in FIG. 2A. Six of the eight signals at the contact points are defined as VCC (supply voltage), RST (reset signal), CLK (clock signal), GND (ground), VPP (programming voltage for programming memory in the card IC), and I/O (serial data input/output). Two contacts are reserved for future use. The assignment of the signals to the smart card contacts is shown in FIG. 2B.

The IC in a smart card processes data such as security control information as part of an access control protocol. The IC includes a control microcomputer, such as the 6805 processor from Motorola Semiconductor, Austin, Tex., which includes ROM, EEPROM, and RAM memory. The processor performs various security control functions including entitlement management and generating the key for descrambling the scrambled data component of the signal.

Entitlement management involves modifying information stored in the card that specifies the card owner's entitlements (i.e. programs and services that a user is entitled to access). The processor adds and deletes entitlements in response to entitlement information in entitlement management messages (EMM) that are included in the input signal. EMM data typically indicates entitlement to a particular service, e.g. all programming on a particular channel, or to a particular program offered by a service, e.g., one movie on a particular channel. Because EMM relates to relatively long term entitlement, EMM typically occurs infrequently in a signal.

Once entitled to a service or program, descrambling of the service or program can occur only after generating a descrambling key. Key generation occurs in response to entitlement control messages (ECM) that are also included in the input signal. ECM provides initialization data for key generation routines that are executed by the processor. Each time a service provider changes the scrambling key, ECM data is included in the signal so that a system entitled to access can generate the corresponding new descrambling key. To aid in preventing unauthorized access to scrambled signals, the key is changed frequently, e.g., every two seconds. Thus, ECM data occurs frequently in the signal.

EMM and ECM data is transferred to the smart card for processing via the serial I/O terminal of the ISO standard 7816 interface. The serial I/O terminal is also used to transfer the generated key from the card to a descrambler unit in the video signal processing channel. The descrambler descrambles the data component of the input signal, e.g. video and audio data, using the key to produce a descrambled, or "plaintext", output signal. Descrambling involves reversing the effects of the scrambling process, e.g., re-inserting sync pulses or decrypting data using the inverse of the encryption algorithm. The descrambled signal is processed further by the signal processing channel to produce video and audio signals suitable for coupling to output devices such as a kinescope and a loudspeaker, respectively.

Including a descrambling function in the video signal processing channel involves adding descrambling hardware to the system. The hardware may be included in a consumer electronics (CE) device, such as a television receiver, or may be in a stand-alone decoder unit, such as a cable box. Including descrambling hardware in a CE device or separate decoder unit dedicates the device to a particular access control system. For example, the hardware may be appropriate for descrambling only a particular type of scrambling algorithm. If the service provider decides to change to a different access control system, e.g. due to security problems, replacing the descrambling hardware involves the expensive and difficult task of modifying CE devices and/or replacing decoder units.

In addition, transferring a descrambling key generated by a smart card to a descrambler external to the smart card provides an opportunity for a "hacker" to attack the security system. Because the security control IC is embedded in the smart card, a hacker cannot access the IC directly as part of an attempt to "hack", i.e. defeat, the security algorithm. Attempting to de-laminate the smart card to access the IC will destroy the IC. However, transferring the key to a descrambler via the card interface increases the likelihood that a hacker may monitor the key transfer protocol, intercept the key and compromise the access control system.

SUMMARY OF THE INVENTION

The invention resides, in part, in recognition of the described problem and, in part, in providing a solution to the problem. In accordance with an aspect of the invention, signal processing apparatus comprises a signal processing channel for processing an input signal having a control information component and having a scrambled data component, and an integrated circuit (IC) card including an IC for providing both key generation and descrambling functions.

In accordance with another aspect of the invention, both the IC in the IC card and the signal processing channel include descrambling functions. Either one or both of the descrambling functions may be used to descramble the scrambled data signal component.

In accordance with another aspect of the invention, the IC card exhibits mechanical characteristics in accordance with ISO standard 7816-1 and includes terminals mounted on a surface of the card in accordance with ISO standard 7816-2 for providing both a serial data interface in accordance with ISO standard 7816-3 and a high-speed data interface.

In accordance with another aspect of the invention, plural integrated circuit cards are series connected to form a signal processing channel in signal processing apparatus. The output signal from one integrated circuit card is routed to at least one other integrated circuit card. The last card in the series connection provides an output signal of the signal processing channel.

In accordance with another aspect of the invention, a television receiver comprises signal processing apparatus including an integrated circuit card reader for coupling a series-connected plurality of integrated circuit cards to a signal processing channel in the television receiver.

BRIEF DESCRIPTION OF THE DRAWING

The invention may be better understood by referring to the accompanying drawing in which.

DETAILED DESCRIPTION

An embodiment of a smart card access control system including the invention will be described in reference to an exemplary video signal processing system that is shown in block diagram form in FIG. 1. The system shown in FIG. 1 includes signal processing functions that may be found in various signal processing systems. A specific example is the DSSTM direct-broadcast satellite television system developed by Thomson Consumer Electronics, Inc.

For a pay-TV service that involves a smart card based access control system, a user wishing to purchase the service contacts the service provider, pays a service-access fee and receives a smart card. A card is issued to a user with initial entitlement information stored in the card's EEPROM. Entitlement information may include data identifying the user and data specifying the scope of initial access entitlement (e.g., duration and/or specific programs the user has paid for). In addition, application-specific key generation software is stored in the card memory.

Entitlement information stored in the card can be modified by the service provider from a remote location using entitlement management messages (EMM) and entitlement control messages (ECM) that are inserted into portions of the signal. EMM includes information indicating subscription (long term access) and pay-per-view (single program access) services that the user has paid for. EMM may be directed to a particular smart card by including identification information in EMM data that corresponds to the identification information stored in the particular smart card. ECM includes data such as initialization data needed to generate descrambling keys. Thus, a signal for a particular program includes both a scrambled data component comprising video and audio data, and a control information component comprising EMM and ECM.

Figure 1:
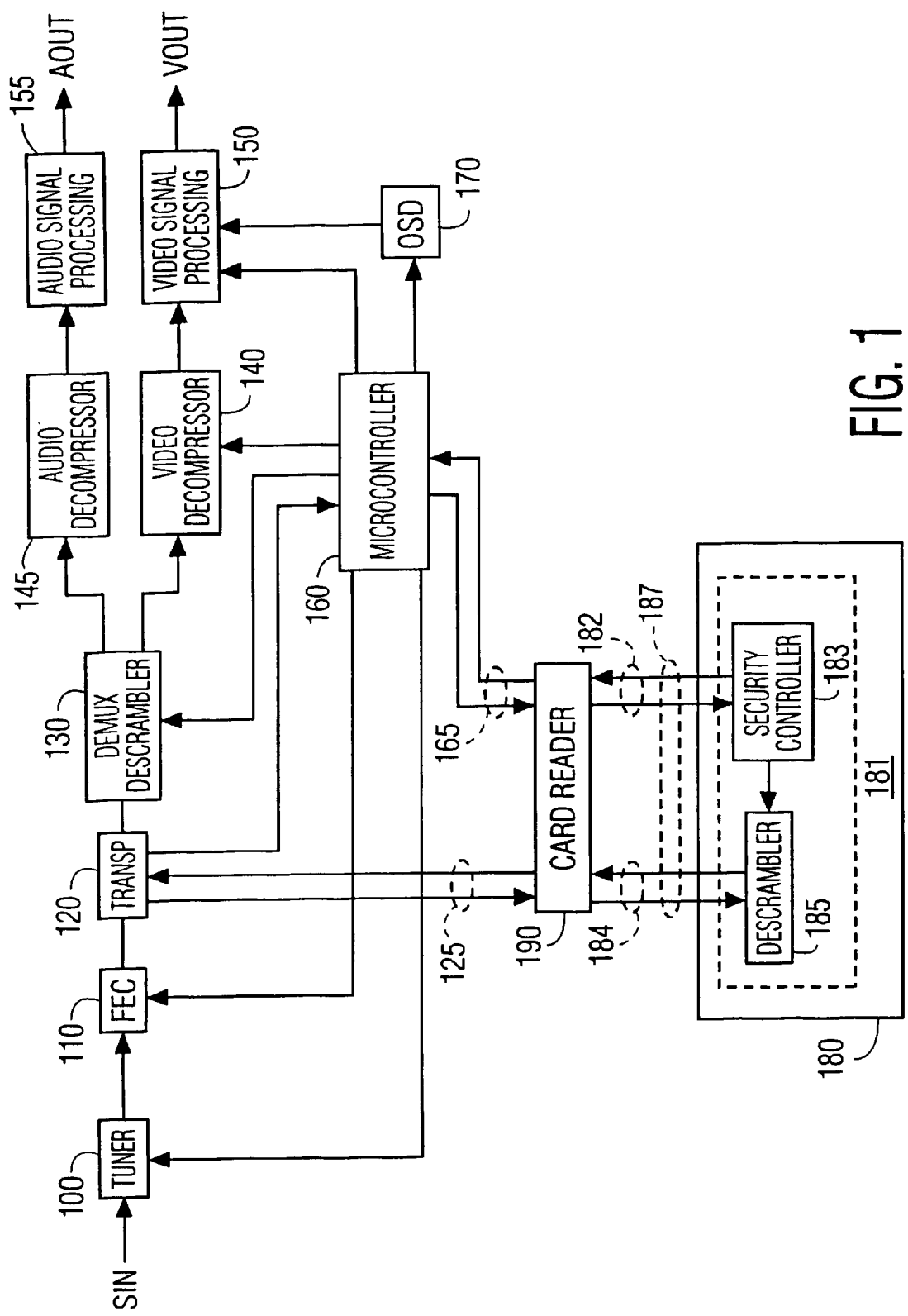
FIG. 1 shows, in block diagram form, a signal processing system including a smart card and embodying aspects of the invention.

When the user wishes to access a pay-TV service, smart card 180 in FIG. 1 is inserted into card reader 190. Card reader 190 couples signals between smart card 180 and a signal processing channel comprising units 100 through 170 in FIG. 1. More specifically, card reader 190 connects to eight terminals that are located on the surface of smart card 180 as specified in ISO standard 7816-2 (see FIG. 2). The connection established by card reader 190 creates interface 187 between smart card 180 and the signal processing channel. In accordance with an aspect of the invention described further below, the eight signals in interface 187 include signals 184, a high speed data input/output (I/O) port for smart card 180, and signals 182, a subset of the ISO standard IC card interface signals.

The desired program or service is selected by tuning the receiver to the appropriate channel using tuner 100. Tuner 100 is controlled by microcontroller 160 in response to user inputs. For example, microcontroller 160 may receive channel selection signals from a remote control (not shown in FIG. 1) activated by a user. In response to the channel selection signals microcontroller 160 generates control signals causing tuner 100 to tune the selected channel.

The output of tuner 100 is coupled to forward error corrector (FEC) 110. FEC 110 monitors error control information, such as parity bits in the tuned signal, to detect errors and, depending on the error control protocol, to correct errors. Microcontroller 160 is coupled to FEC 110 to monitor the occurrence of errors in the signal and control the processing of errors. FEC 110 also performs an analog-to-digital conversion (ADC) function to convert the analog output of tuner 100 to a digital signal at the output of FEC 110.

Figure 3:
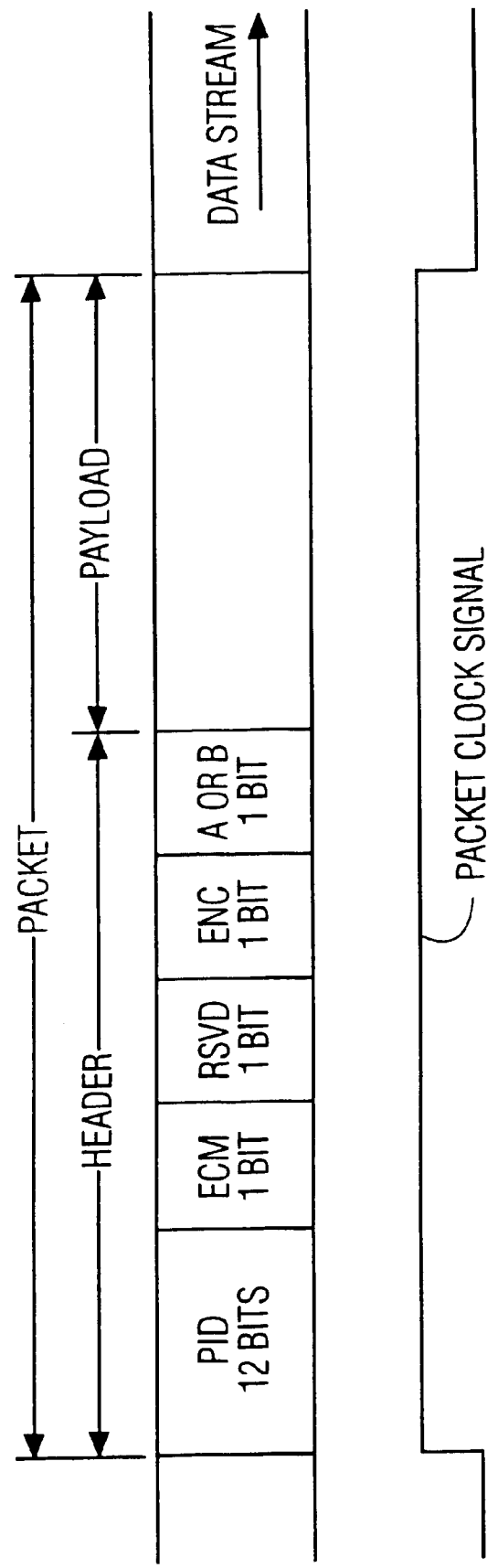
FIG. 3 shows the format of data included in a signal processed by the system in FIG. 1.

Transport unit 120 processes the signal from FEC 110 to detect and separate various types of data in the tuned signal. The data in the signal may be arranged in various formats. FIG. 3 shows an exemplary data format that serves as the basis for the following description. The signal depicted in FIG. 3 comprises a stream of data organized in packets of data bytes, i.e. "packetized" data. Each packet is associated with a particular type, or substream, of information in the tuned channel's data stream. For example, the signal includes packets of program-guide information, control information (e.g., ECM or EMM), video information, and audio information. The sub-stream that a particular packet is associated with is defined by data included in a header portion of each packet. A payload portion of each packet includes the packet data. The exemplary data format shown in FIG. 3 includes two bytes (16 bits) of data in the header and 186 bytes of data in the payload.

The first twelve bits of the header in each packet are program identification (PID) data bits. PID data identifies the data substream that the payload data is associated with.

An example of the information provided by PID data follows:

TABLE 1

| PID Value | Payload contents |
| --- | --- |
| 1 | program-guide information |
| 4 | EMM |
| 10 | video data for channel 101 |
| 11 | audio data for channel 101. |

Other PID values identify video and audio data for other channels.

As part of the tuning process, microcontroller 160 refers to a PID "map" stored in the microcontroller's memory to determine the PID values associated with the tuned channel. The appropriate PID values are loaded into PID registers in transport unit 120. For example, when channel 101 is selected, microcontroller 160 accesses the stored PID map, determines that video data and audio data for channel 101 are associated with PID values of 10 and 11, respectively, and loads the values 10 and 11 into respective video and audio PID registers in transport unit 120. The PID data in incoming packets is compared to the PID values stored in the PID registers to determine the content of the payload of each packet. Microcontroller 160 can update the PID map data in response to PID-to-channel correspondence information in "program guide" packets (PID value of 1).

The last four bits of the header portion of each packet further define the payload contents as follows:

TABLE 2

| Header bit | Designation | Function |
| --- | --- | --- |
| 13 | ECM flag | indicates if payload is ECM |
| 14 | — | reserved |
| 15 | ENC flag | indicates if payload is encrypted |
| 16 | Key flag | indicates whether payload key is key A or key B. |

The ECM flag being active, e.g., at logic 1, indicates that the payload includes ECM data such as initialization data for key generation. The ENC flag being active indicates that the payload is encrypted and, therefore, must be descrambled. The key flag determines which one of two keys, key A or key B, should be used for descrambling the payload (e.g., logic 0 indicates key A, logic 1 indicates key B). Use of the key flag is described below in regard to FIG. 7.

Transport unit 120 in FIG. 1 extracts and processes the header data in response to a packet clock signal shown in FIG. 3. The packet clock signal is generated and synchronized to the data stream by FEC 110. Each transition of the packet clock signal indicates the beginning of a packet. Transport unit 120 processes the 16 bits of header data following each packet clock signal transition to determine the destination for the packet payload. For example, transport unit 120 transfers payloads containing EMM (PID value of 4) and ECM to security controller 183 in smart card 180 via microcontroller 160. Video and audio data are directed to demux/descrambler 130 for descrambling and demultiplexing into video and audio signals. Program guide data (PID value of 1) is directed to microcontroller 160 for PID map updating.

Security controller 183 processes EMM and ECM data to provide access control, functions including entitlement management and key generation. Security controller 183 is included in integrated circuit (IC) 181 and comprises a microprocessor such as the 6805 processor from Motorola. Entitlement management involves processing EMM data to determine how and when entitlement information stored in IC 181 is to be updated, i.e. adding and deleting entitlements. ECM data provides initial values needed for security controller 183 to generate descrambling keys. After being generated by security controller 183, a key is transferred via microcontroller 160 to descrambler 130 where the scrambled data component of the input signal, e.g., the video and audio program data, from the tuned channel is descrambled. In accordance with principles of the invention that are described further below, the descrambling function may also be provided by descrambler 185 included in IC 181.

Descrambled video and audio data is decompressed in video decompressor 140 and audio decompressor 145, respectively. Program data is compressed at the program source using any one of a variety of known data compression algorithms. Decompressors 140 and 145 reverse the effects of the compression algorithm.

The outputs of video and audio decompressors 140 and 145 are coupled to respective video and audio signal processors 150 and 155. Audio signal processor 155 may include functions such as stereo signal generation and digital to analog conversion for converting the digital output signal from decompressor 145 to an analog audio output signal AOUT from processor 155 that can be coupled to a loudspeaker (not shown in FIG. 1). Video signal processor 150 also includes digital to analog conversion capability to convert the digital output of decompressor 140 to an analog video output signal VOUT that is suitable for display on a display device such as a kinescope. Video processor 150 also provides signal switching necessary to include an on-screen display (OSD) signal, produced by OSD processor 170, in signal VOUT. The OSD signal represents, for example, graphics information such as a channel number display that is to be included in the displayed image. Video switches in video processor 150 multiplex the OSD signal into signal VOUT as required to produce the desired display. The operation of OSD processor 170 is controlled by microcontroller 160.

Figure 4:
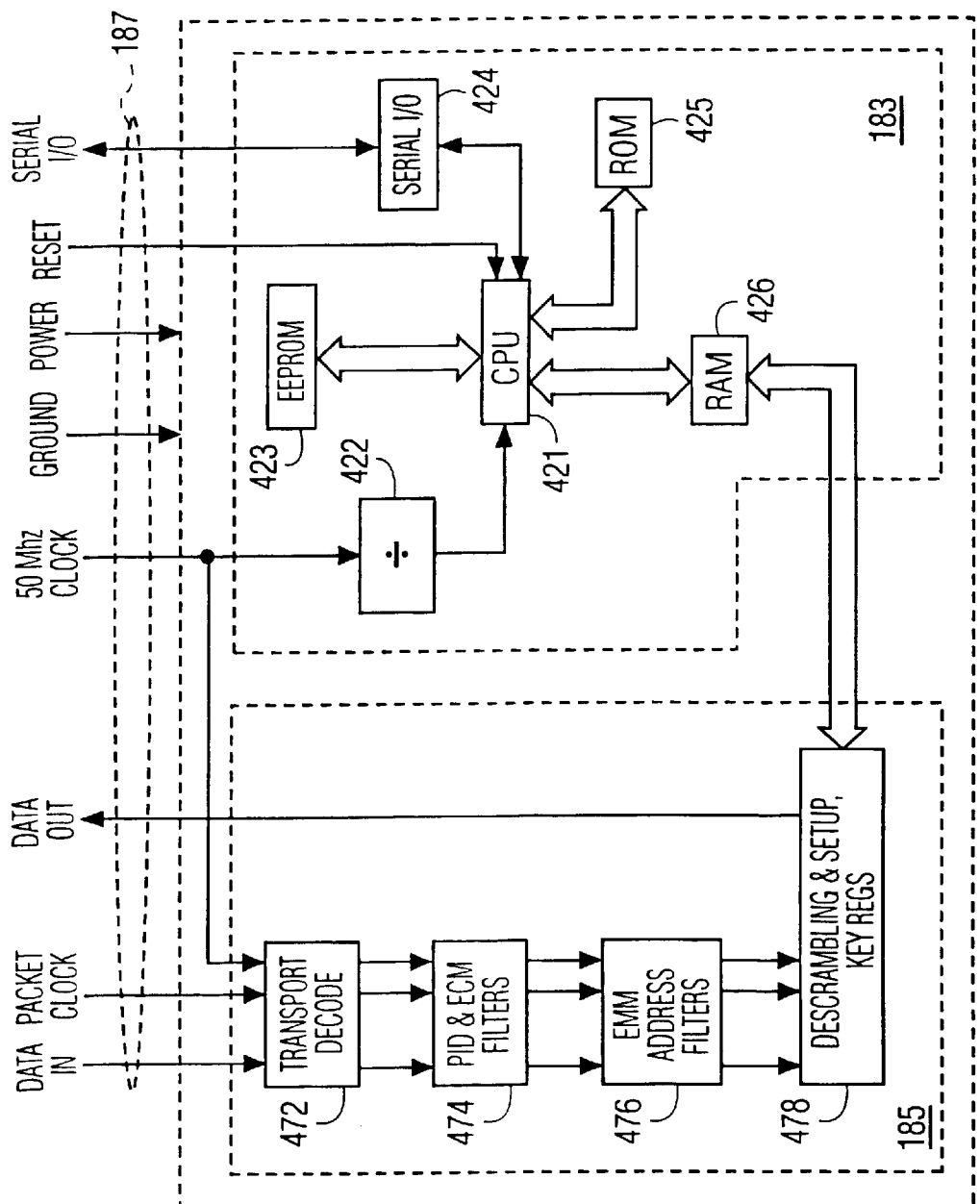
FIG. 4 shows, in block diagram form, an embodiment of signal processing functions included in a smart card suitable for use with the system shown in FIG. 1.

Returning to the access control features of the system shown in FIG. 1, the features and function of smart card 180 may be better understood by referring to the block diagram of smart card IC 181 that is shown in FIG. 4. Reference numerals in FIG. 4 that are the same as in FIG. 1 indicate the same or similar features. In FIG. 4, integrated circuit (IC) 181 includes security controller 183 comprising a central processing unit (CPU) 421, RAM 426, ROM 425, EEPROM 423 and serial I/O unit 424. CPU 421 is a processor such as the 6805 from Motorola. Key generation and entitlement management software is stored in ROM 425 and EEPROM 423.

Data specifying current entitlements is also stored in EEPROM 423 and is modified in response to information in entitlement management messages (EMM) in the received signal. When an EMM packet is detected by transport processor 120 in FIG. 1 (packet PID value of 4), microcontroller 160 in FIG. 1 transfers the packet payload to security controller 183 via serial I/O unit 424. CPU 421 transfers the EMM data in the payload to RAM 426. CPU 421 processes the EMM data and modifies entitlement data stored in EEPROM 423 accordingly.

Packet payloads that include entitlement control messages (ECM), as indicated by the ECM flag in the packet header being active, are transferred from transport unit 120 to security controller 183 via microcontroller 160 and serial I/O unit 424. Any type of packet, e.g., EMM, video, or audio, may include ECM. ECM data is used for generating the descrambling key for a particular type of data. For example, ECM data in an EMM packet is used to generate an EMM descrambling key. When transferred to security controller 183, ECM data is stored in RAM 426 until processed by CPU 421. Key generation software stored in EEPROM 423 and ROM 425 is executed by CPU 421 using the ECM data in RAM 426 to generate a particular key. The ECM data provides information such as initial values required by the key generation algorithms. The resulting key is stored in RAM 426 until transferred by CPU 421 to descrambler 130 via serial I/O unit 324 and microcontroller 160.

EMM and ECM data may be encrypted as indicated by encryption flag ENC in the packet header being active. Encrypted data is transferred from transport unit 120 to descrambler 130 for descrambling before being transferred to security controller 183 for entitlement management or key generation processing.

The features and operation of IC 181 that have been described are typical of known smart card systems. As stated above, however, using a descrambling unit external to a smart card, such as descrambler 130, substantially degrades system security and makes changing descrambling hardware undesirable. The arrangement shown in FIGS. 1 and 4 includes features that significantly improve security in comparison to known smart card systems. In particular, IC 181 of smart card 180 includes descrambler unit 185 and high data rate synchronous interface 184 comprising separate serial data in and serial data out lines. The combination of descrambler 185 and interface 184 makes it possible for all access control processing to occur within smart card 180.

Figures 2A, 2B:
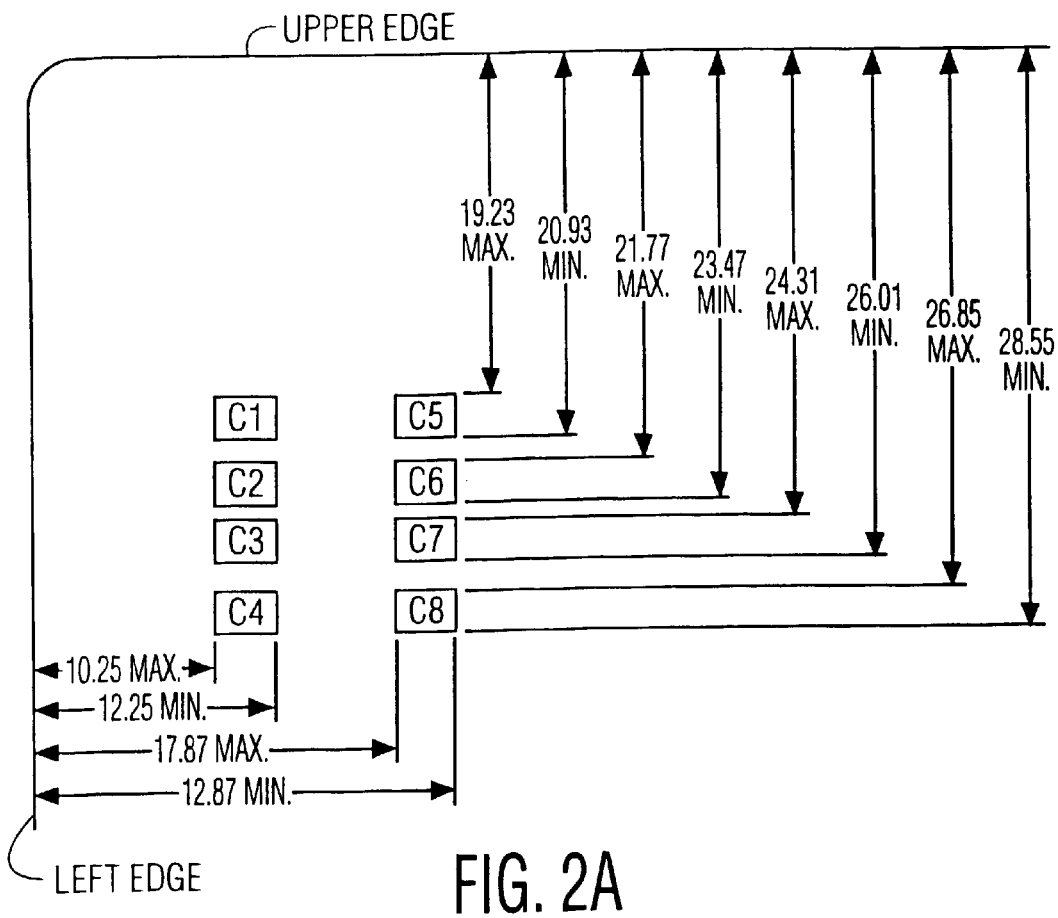
FIG. 2A shows the location of signal contacts on the surface of a smart card in accordance with ISO standard 7816-2.
FIG. 2B shows the assignment of smart card interface signals to the signal contacts shown in FIG. 2A in accordance with ISO standard 7816-2.

In FIG. 1, card reader 190 couples both ISO standard interface signals 165 from microcontroller 160 and high speed interface signals 125 from transport unit 120 to smart card 180 via portions of smart card interface 187 that are labeled 182 and 184, respectively. FIG. 4 shows the signals included in interface 187. ISO standard signals 182 comprise power, ground, reset, and serial I/O in FIG. 4 (correspond to VCC, GND, RST, and I/O in FIG. 2B). High speed interface signals 184 comprise high speed data-in and data-out signals, a packet clock signal, and a high frequency (e.g. 50 MHz) clock signal. ISO standard signal VPP (programming voltage) is replaced by the packet clock signal allowing interface 187, including both high and low speed interfaces, to be implemented using the ISO standard configuration of eight contacts that is shown in FIG. 2A.

Eliminating signal VPP does not preclude the system shown in FIG. 1 from operating with existing ISO standard smart cards that do not include descrambler 185 and high speed data interface 184. Existing smart cards typically include EEPROM circuits that do not require a separate programming voltage. A "charge pump" feature generates the required programming voltage from the card supply voltage when programming is required. Thus, the VPP signal as specified by the ISO standard is an "unused" terminal for most existing ISO standard smart cards. Use of the system with existing smart cards does require modifying the operation of the system such that high speed interface 184 and descrambler 185 are not used. The required modification can be achieved by changing only the control software for controller 160.

Descrambler 185 operates at a high data rate in response to the high frequency clock signal while security controller 183 requires a lower frequency clock signal. Divider 422 in IC 181 divides the 50 MHz clock signal to produce a lower frequency clock signal suitable for security controller 183. Thus, the single high frequency clock signal serves as a timing signal for controlling the operation of both security controller 183 and descrambler 185. Using divider 422 avoids dedicating two of the eight smart card interface signals to separate high and low frequency clock signals.

Descrambler 185 includes transport decode unit 472, PID & ECM filter unit 474 and EMM address filter unit 476 for providing functions similar to the above-described functions of transport unit 120 in FIG. 1. The high speed data-in and data-out signals of interface 187 couple the high speed data stream of the input signal between transport unit 120 and descrambler 185. Including functions of transport unit 120 within smart card 180 enables smart card 180 to process incoming data packets at the high data rate of the input signal. Both the data-in and packet clock signals are coupled to unit 472.

In response to each transition in the packet clock signal, unit 472 processes the 16 bits of header data. The first 12 bits of the header are program identification (PID) data that are directed to PID & ECM filter unit 474. Unit 474 compares the packet's PID data to PID values stored in unit 474 for each type of packet included in the tuned channel. Similarly to the above-described operation of transport unit 120 (see Table 1 above and associated description), PID comparison in unit 474 determines what type of data the payload contains, e.g., program guide, EMM, video, or audio. PID values identifying packet types in the currently tuned signal are stored in registers in unit 474. The registers are loaded as part of the above-described tuning process for the system in FIG. 1. More specifically, microcontroller 160 accesses a stored PID "map" as described above and transfers PID values associated with the currently tuned channel to registers in unit 474 via signals 182 and security controller 183 in smart card 180. Transfer of data between security controller 183 and functions of descrambler 185, such as unit 474, occurs via a data bus internal to IC 181 that is not shown in FIG. 4.

How the payload data is processed by smart card 180 is determined both by the results of PID comparison in unit 474 and by the contents of bits 13 to 16 of the packet header extracted by unit 472. Using the example above relating to channel 101 (see Table 1), PID data identifies: program guide data (PID=1) that microcontroller 160 processes to update the PID map, EMM data (PID=4) that security controller 183 processes to modify entitlements, video data (PID=10) and audio data (PID=11). Bits 13 through 16 of the header control security-related operations (see Table 2 above and the associated description) in smart card 180. If bit 13 (ECM flag) is active, the payload includes ECM data that requires key generation processing by security controller 183. If bit 15 (ENC flag) is active, the payload is encrypted and is descrambled in descrambling unit 478 within descrambler 185. Bit 16 determines whether key A or key B will be used in unit 478 for descrambling.

The encryption status bit ENC determines how payload data will be processed by descrambling unit 478. Payload data that is not encrypted passes unchanged from the high speed data-in terminal of smart card 180 through descrambling unit 478 to the high speed data-out terminal. Encrypted data is descrambled at the data rate by unit 478. Descrambled video and audio data is passed to the high speed data-out terminal of smart card 180. In each descrambled audio or video packet, the ENC bit in the packet header is set to logic 0 indicating that the packet is "clear", i.e. descrambled. To ensure that unauthorized users do not access entitlement or key related data, descrambled EMM or ECM data is not passed out of smart card 180 via the high speed data our terminal. Instead, the original scrambled EMM or ECM data, with the ENC bit set to logic 1, is passed through smart card 180 from the high speed data-in terminal to the high speed data-out terminal. EMM and ECM data that is descrambled in descrambling unit 478 is stored temporarily in RAM 426 in security controller 183 until processed by security controller 183 for entitlement management and key generation. Transport unit 120 in FIG. 1 receives the data (either unchanged or descrambled) from the high speed data-out terminal of smart card 180. The PID value of each packet is checked and the payload is transferred to the appropriate function in FIG. 1 for further processing (e.g., microcontroller 160 or decompressors 140 and 145).

The operation of smart card 180 is controlled by commands from microcontroller 160 in FIG. 1 that are communicated to smart card 180 via the ISO standard serial interface. In effect, microcontroller 160 is the master processor and security controller 183 is the slave processor. For example, microcontroller 160 transfers PID information to smart card 180 and directs the card to descramble the data in the corresponding data streams. Security controller 183 responds by checking entitlements and configuring smart card 180 for the appropriate type of data processing such as entitlement processing, key generation or descrambling. In addition, microcontroller 160 requests status information such as whether descrambling is in progress. Commands are communicated to security controller 183 in smart card 180 via the serial I/O terminal. Any response required by the command is returned to microcontroller 160 via the serial I/O terminal. Thus, the serial I/O signal serves as a control signal between the system and smart card 180 while the high-speed data interface provides high-speed input and output data signals between the card and the system.

Serial communications between microcontroller 160 and smart card 180 occur according to a protocol provided for in ISO standard 7816-3. A smart card notifies the system of the particular protocol that will be used by sending a protocol type number T to the system. More specifically, when a card is inserted into the card reader, the card reader applies power to the card and resets the card by activating the reset signal. The card responds to the reset signal with an "answer to reset" data sequence specified in ISO standard 7816-3 §6. The answer to reset includes an interface byte TDi. The four least significant of byte TDi define the protocol type number T (see ISO standard 7816-3 §6.1.4.3).

The protocol type for the system shown in FIG. 1 is type T=5. A type 5 protocol is classified as "reserved", i.e. currently undefined, in the ISO standard. For the system in FIG. 1, protocol type 5 is identical to protocol type 0 (an asynchronous half-duplex protocol defined in ISO 7816-3 §8) except for the manner in which the baud rate for serial I/O is determined. Serial I/O at the card interface occurs at a rate determined according to Table 6 in ISO standard 7816-3. The baud rate calculation is based on the rate at which security controller 183 is clocked. For existing smart cards, the clock frequency for security controller 183 is equal to the clock frequency $f_s$ at the card's clock pin. As shown in FIG. 4, smart card 180 includes divider 422 for dividing the rate of the high speed input clock Fin by a factor N, i.e. $F_{in}/N$, to establish the clock rate for security controller 183. Thus, for a type 5 protocol, Table 6 of ISO standard 7816-3 is modified by defining $f_s=F_{in}/N$.

As in the case of a type 0 protocol, all commands for a type 5 protocol are initiated by microcontroller 160. A command begins with a five byte header including a one-byte instruction class designation (CLA), a one-byte instruction (INS), a two-byte parameter (P1,P2) such as an address, and a one-byte number (P3) defining the number of data bytes that are part of the command and follow the header. For the system in FIG. 1, parameter P1,P2 is not needed and, therefore, these bytes are "don't cares". Thus, commands take the form:

CLA|INS|–|–|P3|data (P3 bytes).

Commands recognized by smart card 160 include a status command and a PID transfer command. Smart card 160 responds to a status command from microcontroller 160 by providing the processing status of the card, e.g. whether the card has completed key generation or whether the card is descrambling data. Using a PID transfer command, microcontroller 160 transfers PID numbers associated with the tuned channel. Other commands such as commands for transferring EMM and ECM data, key related commands, and "purchase offer" commands are possible and will be explained below.

Figure 5:
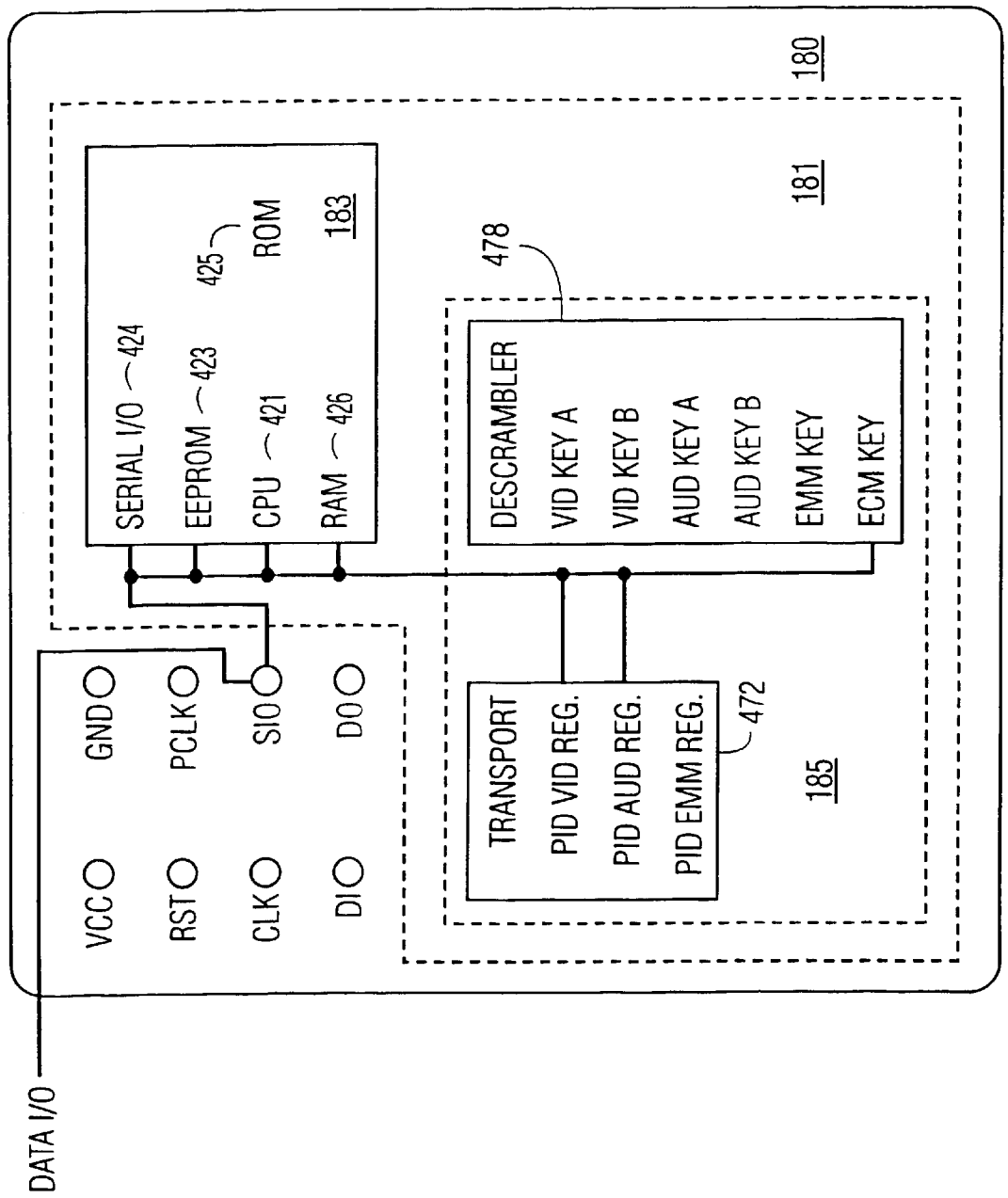
FIGS. 5 through 8 illustrate signal routing through the smart card shown in FIG. 4 during various modes of operation of the system shown in FIG. 1.

The operation of smart card 180, and in particular descrambler 185, will now be described in more detail in reference to FIGS. 5 through 8. When a new channel is tuned, microcontroller 160 transfers PID values for the new channel from the PID map to smart card 180 as shown in FIG. 5. The PID data transfer occurs using a PID transfer command including N PID values, where N is specified in byte P3 of the command header. The command and PID values are communicated to the card via the serial data terminal of smart card 180 and serial input/output unit 424. CPU 421 receives the PID data and directs the data to the appropriate PID register in registers 474 in descrambler 185.

Figure 6:
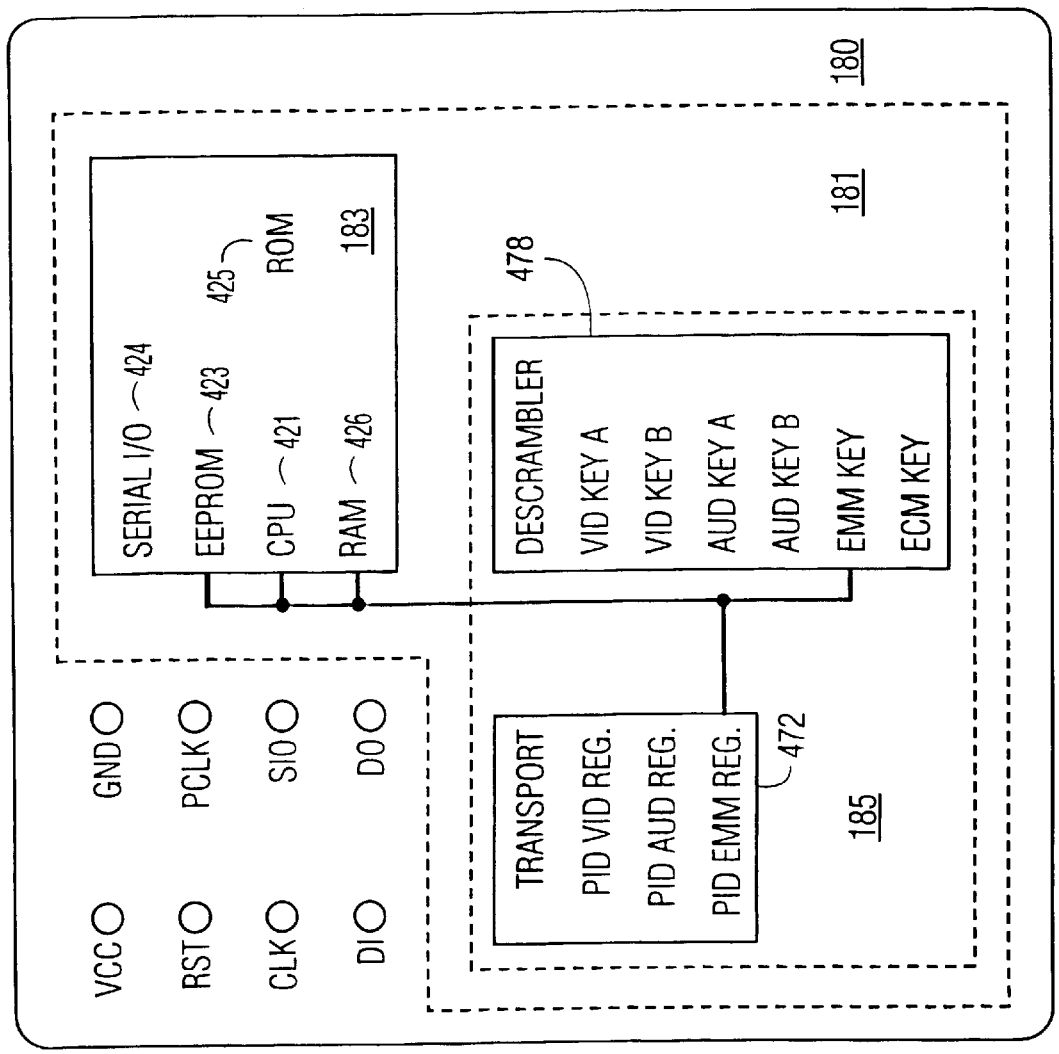

Before a signal can be descrambled, a user must be entitled to access and the correct key must be loaded into descrambler 185. After transfer of the PID data to smart card 180, security controller 183 compares the PID values to entitlement data stored in EEPROM 423 to see if the user is entitled to access the tuned channel. Assuming the user is entitled, the next step is key generation. Key generation involves processing ECM data. Thus, ECM must be received and processed to produce the key before audio and video data can be descrambled. ECM data is encrypted to reduce the likelihood of unauthorized key generation. A card is issued with a key for descrambling ECM stored in the card in EEPROM 423. As illustrated in FIG. 6, the ECM key is transferred by CPU 421 from EEPROM 423 to ECM key registers in descrambling unit 478.

If the user is not entitled to access the tuned channel, entitlements must be received before key generation and descrambling can occur. A user can obtain entitlements in at least two ways. First, entitlements can be received via EMM. An "address" identifying a particular smart card is stored in EMM address unit 476 of the card when the card is issued. By including address information in EMM, a service provider can direct EMM to a particular card. The smart card compares the address information in EMM with the card address stored in unit 476 to detect EMM information directed to the card. If a user is not entitled, security controller 183 configures the card for EMM processing as shown in FIG. 6 in case EMM data is received.

As in the case of the ECM key, a card is issued with an EMM key stored in the card in EEPROM 423. In FIG. 6, the EMM key is transferred from EEPROM 423 to EMM key registers in descrambling unit 478 by CPU 421. Scrambled EMM data from transport unit 120 in FIG. 1 is input to the card via the high speed data-in port. After checking the EMM address in unit 476, EMM data intended for the card is decrypted in descrambling unit 478. Decrypted EMM data is temporarily stored in RAM 426 and processed by CPU 421 to update entitlement data stored in EEPROM 423.

A user can also obtain entitlements via "impulse" purchase. When a user tunes a particular channel and security controller 183 determines the user is not entitled to access, smart card 180 can generate a "purchase offer" menu that is displayed on the video display device. The menu provides the user with an opportunity to select various options such as purchasing access to programming on the tuned channel. If the user selects to purchase access, entitlements in the smart card are updated and access to the channel is enabled followed by key generation and descrambling as described below. The purchase information is communicated to the service provider via a "reportback" function. The service provider then bills the user for the cost of the purchased entitlements. A similar sequence of events can occur in response to a user deciding to purchase entitlement to pay-per-view (PPV) programming that is advertised on a promotional, or "promo", channel. The system detects the users selection of a particular PPV program, the smart card updates entitlements, and communicates the purchase information to the service provider via a reportback function.

A more detailed description of the purchase offer menu feature follows. If security controller 183 determines that a user is not entitled to access the tuned channel, and the tuned channel supports the purchase offer feature, CPU 421 sets a flag in a status register indicating that a purchase offer menu display is pending. Controller 160 periodically sends a command to smart card 180 requesting status information and smart card 180 responds with the contents of the status register. Thus, controller 160 detects the purchase offer menu pending flag and sends a command to smart card 180 requesting the menu information.

Smart card 180 responds with the data that is to be included in the menu such as the purchase options. Controller 160 transfers the information to on screen display unit (OSD) 170 in FIG. 1 where the menu display signal is generated. The user's selection, e.g. "purchase" or "no purchase", is entered via a remote control and received by controller 160. The response is communicated to smart card 180 via a command from controller 160. If access is purchased, entitlements in smart card 180 are updated.

The purchase information is communicated to the service provider via a reportback message so that the user can billed for the cost of the service. Reportback messages can be sent to the service provider via the user's telephone line and a modem included in the system. Microcontroller 160 can schedule reportback to occur at a time when it is unlikely that the phone line is in use (e.g., the middle of the night). When a purchase occurs, the status register in smart card 180 is updated to set a flag indicating that a reportback message is pending. A subsequent status command from controller 160 detects the reportback message pending flag. When reportback is to occur, controller 160 sends a command to smart card 180 requesting the reportback message contents. In addition to purchase data, the reportback message may include information such as the telephone number to be dialed by the modem to establish a reportback channel to the service provider. After receiving the reportback message contents from smart card 180, controller 160 establishes connection with the service provider, e.g. via a modem, and transfers the message contents to the service provider.

Figure 7:
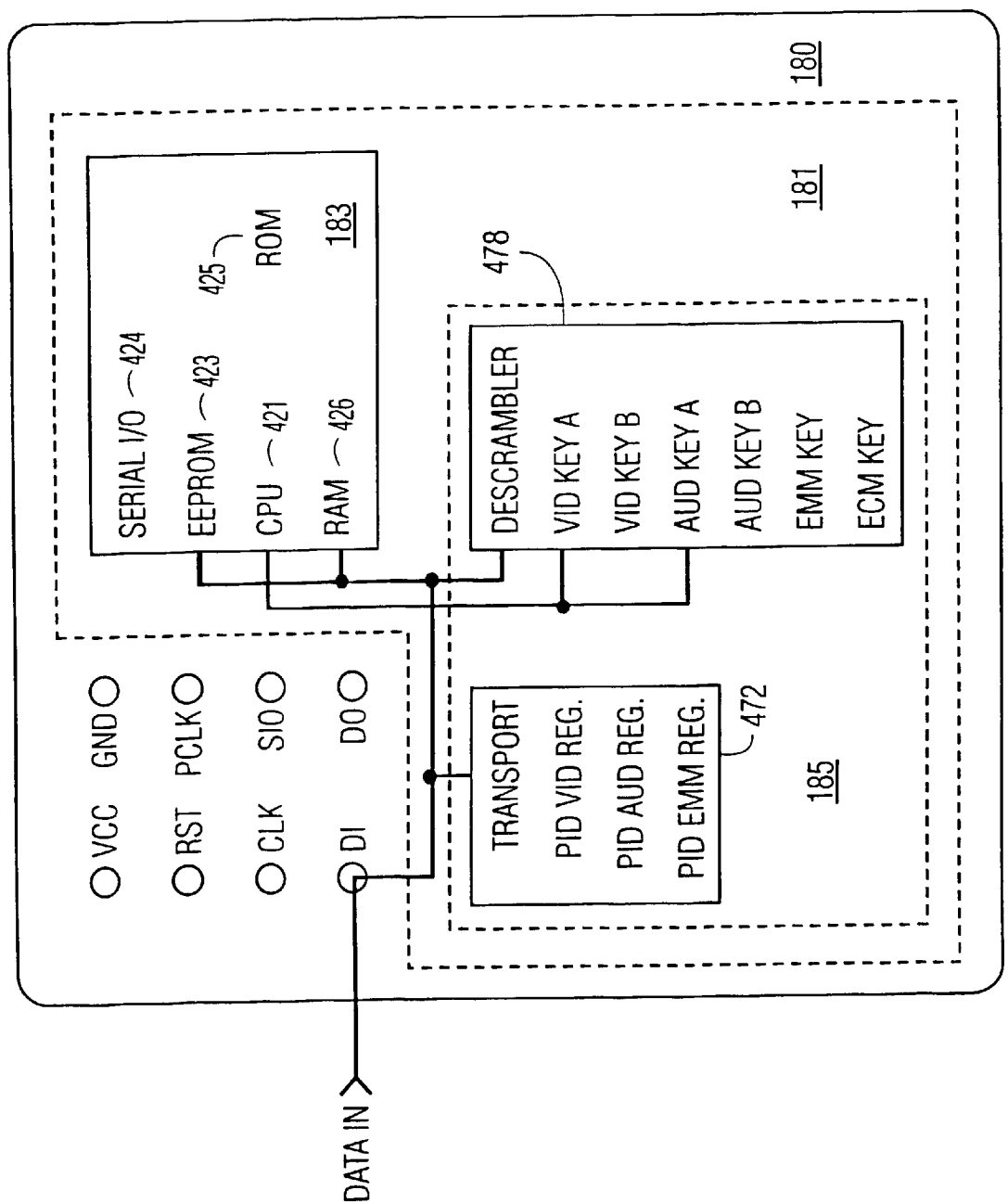

After the PID values are loaded, entitlements exist, and the ECM key is in place in descrambler 185, the card is ready to descramble ECM data and generate the audio and video keys. In FIG. 7, ECM data in the signal is received by smart card 180 via the high speed data-in terminal and detected by transport decode unit 472. The ECM data is directed to descrambler 478 where the previously loaded ECM key is used to decrypt the ECM data. The decrypted ECM data is transferred from descrambler 478 to RAM 424. When decrypted ECM data is available, CPU 421 executes key generation algorithms stored in EEPROM 423 and ROM 425 using the decrypted ECM data in RAM 424 to generate the video and audio keys. The generated keys are transferred to the appropriate video and audio key registers in descrambler 478.

As shown in FIG. 7, descrambler 478 includes two key registers for video, video keys A and B, and two key registers for audio, audio keys A and B. Whether key A or B will be used to descramble a particular packet is determined by the key flag bit in the packet header (see Table 2 above). The "multi-key" feature is used to permit a new key to be generated while an existing key is being used to descramble data. Processing ECM data in security controller 183 to generate a new key and transferring the new key to a key register in descrambler 478 requires a significant number of instruction cycles in CPU 421. If descrambling was halted during the generation and transfer of a new key, the processing delay would require someone viewing a program to watch a scrambled image until the new key was in place in descrambler 478. Having key registers A and B permits data to be decrypted using a key in one key register, e.g., key register A, while a new key is being generated and loaded into the second key register, e.g., key register B. After initiating key generation by transmitting ECM data, a service provider waits for a time period sufficient to ensure that new key B is generated and in descrambler 478 before encrypting packets using key B. The key flag notifies descrambler 185 when to begin using the new key.

Figure 8:
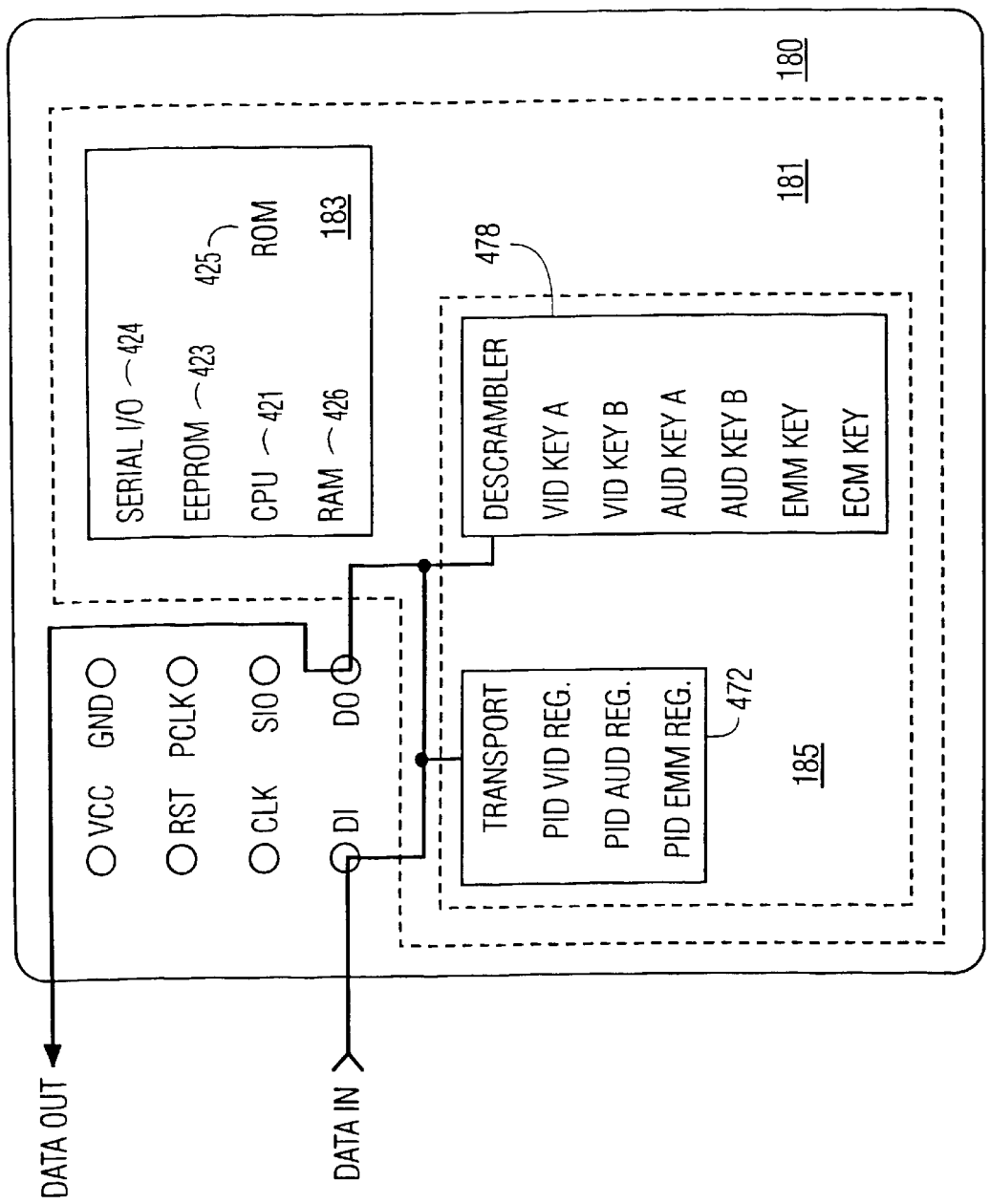

After the operations shown in FIGS. 5, 6, and 7, descrambler 478 has been initialized with all key information needed to process encrypted data in the tuned channel, including EMM, ECM, video and audio data. FIG. 8 shows the signal flow for data processing. Encrypted data enters smart card 180 via the high speed serial data input terminal. The data is decrypted in descrambler 478 using the previously loaded keys. For example, if transport unit 472 determines from the header of an incoming packet that the payload data is video data associated with video key A, the packet payload is decrypted in descrambler 478 using video key A. The decrypted data is output directly from smart card 180 via the high speed serial data output terminal. Note that data processing in FIG. 8 does not require interaction between descrambling unit 185 and security control unit 183 allowing descrambler 478 to process data at the high data rate of the input signal.

Key generation in security controller 183 combined with the descrambling features of descrambling unit 478 provides complete capability in smart card 180 for processing signals encrypted using a variety of algorithms including the data encryption standard (DES) algorithm and Rivest-Shamir-Adlemann (RSA) algorithms. By providing all access control related processing within smart card 180, security related data such as key data does not have to be transferred out of smart card 180. As a result, security is improved significantly in comparison to systems using a descrambler external to the smart card.

Although the use of descrambler 185 internal to smart card 180 is advantageous, an external descrambler such as descrambler 130 in FIG. 1 may also be used. An external descrambler may be desirable for compatibility of the described smart card with existing pay-TV systems that generate the key in smart card 180 and transfer the key to descrambler 130. Alternatively, using both descrambler 185 and descrambler 130 may be desirable. For example, security can be improved by encrypting a signal twice using two different keys. A twice-encrypted signal could be decrypted using the system shown in FIG. 1 by: decrypting the signal once in descrambler 185 using the first key, transferring the partially decoded data to descrambler 130, and decrypting the signal a second time in descrambler 130 using the second key. The second key would be generated in smart card 180 and transferred to descrambler 130.

For applications involving descrambler 130 (i.e. applications in which key data is transferred out of smart card 180), commands are provided for transferring the key data via the serial I/O interface between controller 160 and smart card 180. For example, microcontroller 160 sends ECM data to the card in one command and requests the status of key generation with a status command. When the status data indicates that key generation is complete, another command requests the key data and the card responds by sending the key data to controller 160. Subsequently, the key is transferred to descrambler 130.

The invention also provides advantages in regard to security management. For example, the access control software and hardware, may be changed easily and inexpensively by sending new smart cards to all authorized users. In prior systems, a change in access control hardware dedicated to a particular algorithm required the expensive and time-consuming task of replacing all decoder units containing the descrambler hardware. The present invention permits service providers and receiver manufacturers to initially provide generic card readers and signal processors. All application-specific access control capability is provided by the smart card.

The invention may also be useful for access control operations involving encryption such as in "head-end" (i.e. signal source) applications. By including the appropriate encryption algorithm software in the EEPROM and ROM of security controller 183, it is possible for descrambler 185 to encrypt an input signal. The head-end hardware for generating the transmitted signal would include a card reader such as card reader 190 in FIG. 1. The signal from a signal source such as a video camera is processed and coupled in plaintext, i.e. un-encoded, form to the high speed input of smart card 180. Descrambler 185 produces an encrypted signal at the high speed output of smart card 180 that is transmitted to users. Thus, service providers can benefit from advantages of the invention such as improved security and ease of changing access control hardware and software.

Another aspect of the invention involves modifying the system of FIG. 1 to include an arrangement of a plurality of smart cards in which the high speed data paths of the cards are connected in series. More specifically, the high speed data-out terminal of one card is connected to the high speed data-in terminal of the next card. Series-connected smart cards may be advantageous in a variety of applications. For example, series-connected smart cards can descramble signals that have been encrypted more than once for the purpose of improving security. Each smart card in the series-connected arrangement is configured to descramble a particular level of encryption.

A series-connection of smart cards is also useful if a user subscribes to more than one pay-for-access service and possesses more than one smart card. A system capable of processing data in only one smart card forces the user to manually change smart cards when selecting a different pay-for-access service. A system including a series-connected plurality of smart cards eliminates the need to manually change smart cards because the signal is processed by each card in the "stack" of series-connected cards. The card in the stack that corresponds to the tuned channel descrambles signal. Cards that are not associated with the tuned channel pass the signal unchanged.

Series-connected smart cards are also useful in a picture-in-picture (pix-in-pix or PIP) video system. A PIP system generates a signal representing both a main video picture and one or more small pictures that are inset into the display of the main picture. Typically, the main picture represents the signal from one channel while the inset picture represents the signal from a second channel. With a series connection of two or more smart cards, one smart card could descramble the signal for the main picture while another smart card descrambles the signal for the inset picture.

Figure 9:
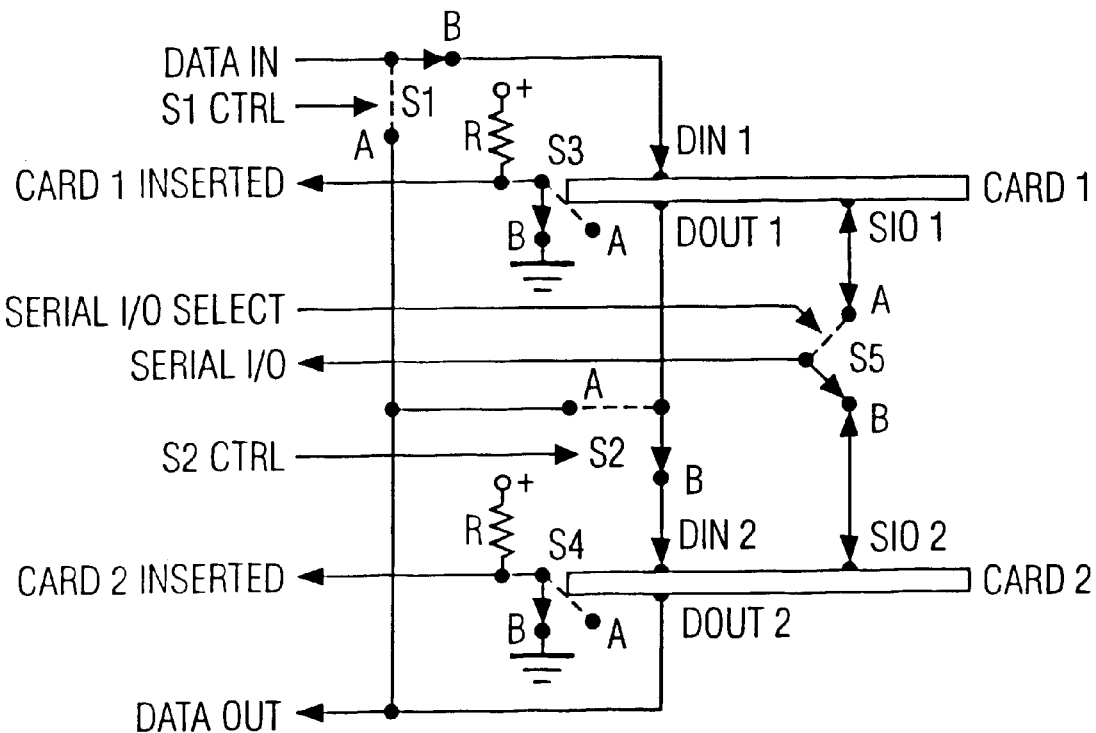
FIG. 9 shows an embodiment of an aspect of the invention involving a series-connection of a plurality of smart cards.

FIG. 9 shows a switching arrangement for use in a smart card reader to provide the described series-connected high speed data path. In FIG. 9, switches 1 and 2 are responsive to the insertion of cards 1 and 2, respectively, into the card reader. Switches 1 and 2 determine the routing of the high speed DATAIN and DATAOUT signals to the descrambler in the respective smart card. Each switch is shown as a single-pole-single-throw (SPST) switch that will be in one of two possible states, A or B, depending on whether or not the corresponding card is inserted: state A if the respective card is not inserted, and state B if the card is inserted. In state A, a switch causes input data, i.e. signal DATAIN, to bypass the corresponding card. In state B, input data is connected to the inserted card.

FIG. 9 shows both cards 1 and 2 inserted causing both switches 1 and 2 to be in position B. As a result, high speed data is routed from DATAIN through cards 1 and 2 in series. If only a single card is being used, card 2 is not inserted, switch S2 is in position A, and high speed data bypasses card 2. The switching configurations for the arrangement in FIG. 9 are listed in Table 3.

TABLE 3

| Card Status | | Switch Position | | |
|---|---|---|---|---|
| Card 1 | Card 2 | S1 | S2 | Connection |
| inserted | inserted | B | B | DATAIN to DIN1; DOUT1 to DIN2; DOUT2 to DATAOUT |
| inserted | removed | B | A | DATAIN to DIN1; DOUT1 to DATAOUT (bypass card 2) |
| removed | removed | A | A | DATAIN to DATAOUT (bypass cards 1 & 2) |

The operation of the high speed data signal switching arrangement shown in FIG. 9 involves signals S1 CTRL, S2 CTRL, CARD1 INSERTED and CARD2 INSERTED. Switches S1 and S2 are electronic switches controlled by signals S1 CTRL and S2 CTRL, respectively. The switch control signals are generated by a control processor either in the card reader or in the system (e.g., microcontroller 160 in FIG. 1) in response to signals CARD1 INSERTED and CARD2 INSERTED. Signals CARD1 INSERTED and CARD2 INSERTED are generated by switches S3 and S4, respectively, in response to the insertion of the corresponding card and are coupled to respective interrupt inputs of microcontroller 160.

Before card 1 is inserted, signal S1 CTRL is at logic 0 causing electronic switch S1 to be at position A and signal DATAIN bypasses card 1. Inserting card 1 into the card reader causes switch S3 to change from position A (card removed) to position B (card inserted). As a result, signal CARD1 INSERTED changes from logic 1 (+supply voltage) to logic 0 (ground). The interrupt handling routine of microcontroller 160 detects the change in signal CARD1 INSERTED and changes the level of signal S1 CTRL. Switch S1 responds by changing to position B coupling signal DATAIN to card 1. Switches S2 and S4 operate in a similar manner in response to card 2 being inserted.

The described card reader operation routes the high speed data signal through the descrambler of each card inserted in the card reader. For descrambling a signal that was encrypted more than once, each descrambler in the series connection descrambles the signal using a particular key and algorithm. For a series connection of cards in which each card corresponds to a particular service, each card descrambles data for the service associated with the card and passes other data unchanged. Selective descrambling in each card is accomplished by PID processing in each card. The PID registers in each card are loaded with the PID values for the service corresponding to the card. Each card checks the PID data in the header of each packet in the signal. If the PID data does not correspond to the PID data stored in the card, the data passes through the card unchanged. A packet payload is descrambled only in a card in which the card PID data matches the packet PID data.

Control of a multi-card series-connected "stack" such as that shown in FIG. 9 is accomplished via the ISO standard serial I/O signal. In addition to the high-speed data I/O signals shown in FIG. 9, smart card interface signals "clock", "packet clock", "power" and "ground" (see FIG. 4 and associated description) are coupled to each card inserted in card reader 190. Interface signals "serial I/O" and "reset" are coupled to only one smart card at any particular time. Controller 160 detects that a card is inserted via signals CARD1 INSERTED or CARD2 INSERTED and controls switch S5 to couple the serial I/O and reset signals to an inserted card, as needed, to transfer data to the card. If more than one card is inserted, controller 160 communicates with a particular card by controlling switch S5 to couple the serial I/O and reset signals to only that particular card. The flow of high speed data through each card in the serially-connected stack of cards is not affected by the operation of switch S5.

One aspect of the control of a card stack involves a delay between high speed data and the packet clock signal that depends on the location in the stack of a particular card. The high speed data path of a smart card exhibits a bit delay from data-in to data-out equal to the number of high speed clock cycles required for the data processing operation that is occurring in the card. A card that is merely passing data from data-in to data-out will create a different bit delay than a card that is descrambling data. The series connection of cards in the stack causes high speed data arriving at a particular card in the stack to exhibit a bit delay with respect to packet clock that depends on the number of cards in the stack prior to a particular card and the type of processing occurring in each card prior to a particular card.

If the bit delay is not corrected, cards in the stack other than the first card will process the packetized data stream improperly. For example, packet header data is extracted based on the occurrence of transitions in the packet clock signal. A bit delay with respect to packet clock will result in improper extraction of the header data and, subsequently, incorrect processing of the payload data.

Correcting for bit delays is accomplished by communicating bit delay information between controller 160 and security controller 183 of each card in the stack. Each card returns its particular bit delay value to controller 160 in response to a command from controller 160. A card determines its current bit delay by, for example, referring to a look-up table in the card memory that specifies a bit delay value for each data processing mode, i.e. descrambling, pass-through, etc. Controller 160 acquires the bit delay data for each card in the stack and sends to each card information including: the number of cards in the stack, the position of the card in the stack (e.g., card 2) and the bit delay for all cards in the stack prior to the particular card. The card corrects for bit delay by, for example, using the stack bit delay information from controller 160 to control a variable delay circuit included in the packet clock signal path within transport unit 478.

Figure 10:
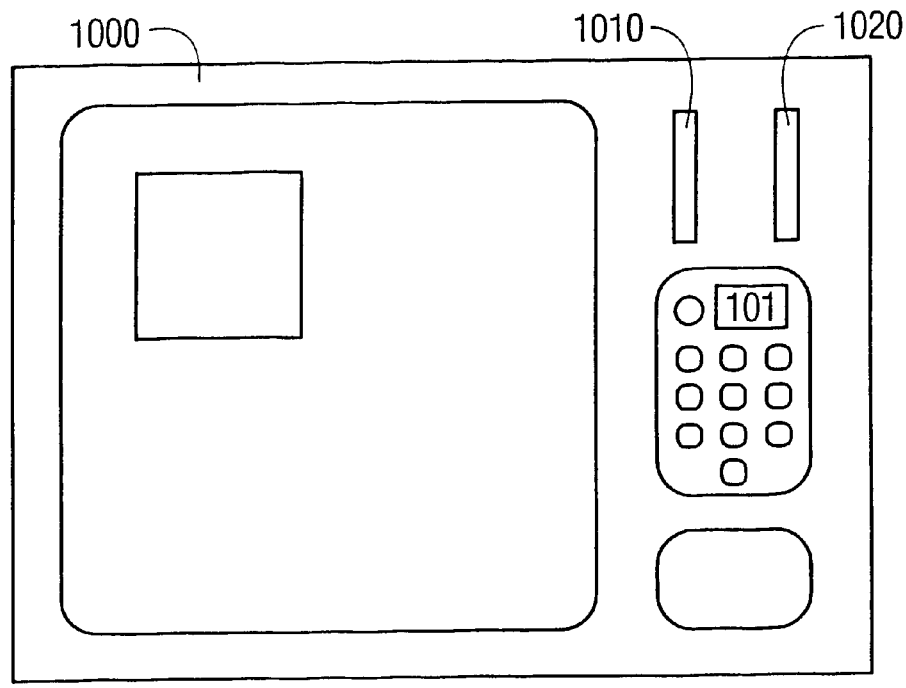
FIG. 10 shows a television receiver including the embodiment shown in FIG. 9.

The arrangement shown in FIG. 9 for reading a plurality of smart cards can be included in a television receiver. For example, FIG. 10 shows a television receiver 1000 including the capability for simultaneously reading two smart cards. Two cards are inserted in slots 1010 and 1020. Card reading circuitry similar to circuitry shown in FIG. 9 is included in receiver 1000 to produce the above-described series connection of two smart cards.

Although the described embodiments involve the video signal format shown in FIG. 3, it will be readily apparent to one skilled in the art that the invention is applicable to other video systems and video signal protocols such as the above-mentioned DSS™ satellite system and high-definition television (HDTV). Also, the invention is applicable to systems other than television systems. For example, an access control system including the invention may be useful in telephone systems such as cellular and cordless telephone systems in which security is an important consideration.

Also, the arrangement shown in FIG. 9 may be expanded to accommodate more than two smart cards by adding a switch and card detection capability (i.e. generating a CARD INSERTED signal) for each additional card. In addition, the switching arrangement in FIG. 9 could be modified to control switches S1 and S2 directly in response to cards being inserted rather than relying on control by microcontroller 160. For example, switch S3 could be mechanically, or electrically, coupled directly to switch S1 such that inserting card 1 causes switch S1 to route data through card 1.

Although the described embodiments relate to digital I/O signals coupled to smart card 180, smart card 180 may also process analog signals. For example, smart card 180 may include an analog to digital converter (ADC) at the high-speed data input and a digital-to-analog converter (DAC) at the high-speed data output. The ADC and DAC may be located on IC 181 in FIG. 1. Alternatively, IC 181 may be replaced with a "hybrid" device, i.e. rather than just IC 181, smart card 180 would include ADC and DAC circuits and IC 181 all mounted and interconnected on a single substrate. For an analog signal processing smart card, card reader 190 would couple analog signals to the smart card. These and other modifications are intended to be within the scope of the following claims.

What is claimed is:
1. Apparatus for processing a signal comprising:
 (a) a card body;
 (b) means for receiving a digital input stream from a location external to said card body, said input stream having a control component and a scrambled data component identified by respective header portions, said scrambled data component comprising at least one of audio and video data;

(c) means for generating, within said card body, a key code in response to said control component;

(d) means for descrambling, within said card body, said data component in response to said key code to produce an output stream having a descrambled data component;

(e) transport means, within said card body, for detecting said header portions of said components, separating said input stream into said components and routing, within said card body, said control component to said generating means and said scrambled data component to said descrambling means in accordance with said header portions;

(f) means, within said card body, for coupling said key code between said generating means and said descrambling means; and (g) means for providing said output stream to a location external to said card body.

2. The apparatus of claim 1 wherein:

said control component is encrypted and said card body further comprises a means for storing a second key code; said second key code being coupled, within said card body, to said generating means;

said generating means decrypts said encrypted control component in response to said second key code to generate a decrypted control component and generates said first mentioned key code in response to said decrypted control component.

3. The apparatus of claim 2 further comprising:

a high speed data interface for transferring digital data between said card body and a location external to said card body.

4. The apparatus of claim 3 wherein:

said card body has a plurality of terminals arranged on a surface of said card body in accordance with ISO standard 7816-2.

5. The apparatus of claim 4 further comprising:

a frequency divider for providing a first timing signal to said descrambling means and a second timing signal to said generating means, wherein the data rate of said first timing signal exceeds the data rate of said second timing signal.

6. A method for processing a signal comprising:

(a) receiving, in a card body, a digital input stream having a control component and a scrambled data component identified by respective header portions from a location external to said card body, said scrambled data component comprising at least one of audio and video data;

(b) generating a key code, within said card body, in response to said control component;

(c) descrambling said data component, within said card body, in response to said key code to produce an output stream having a descrambled data component;

(d) processing, within said card body, said input stream by detecting said header portions of said components, separating said input stream into said components and routing said control component to said generating means and said scrambled data component to said descrambling means in accordance with said header portions;

(e) coupling, within said card body, said key code between said generating means and said descrambling means; and (f) providing said output stream to a location external to said card body.

7. The method of claim 6 wherein:

said control component is encrypted and further comprising the steps of decrypting said control component in response to a second key code stored within said card body to generate a decrypted control component and generating said first mentioned key code in response to said decrypted control component.

8. Signal processing apparatus comprising:

(a) a signal processing channel for processing a digital input stream having a control component and a scrambled data component identified by respective header portions, said scrambled data component comprising at least one of audio and video data;

(b) means for coupling said input stream to a removable card assembly, said card assembly generating a key code in response to said control component, descrambling said scrambled data component in response to said key code to generate a descrambled data component, processing said input stream by detecting said header portions of said components, separating said input stream into said components and routing said control component to said generating means and said scrambled data component to said descrambling means in accordance with said header portions; and coupling, within said card body, said key code between said generating means and said descrambling means;

(c) means for receiving from said card assembly a processed input stream, said processed input stream including said descrambled data component; and (d) means for processing said descrambled data component to generate an output stream.

9. The signal processing apparatus of claim 8 wherein:

said key code is coupled, within said card body, between said generating and descrambling means.

10. The signal processing apparatus of claim 9 wherein:

said control component is encrypted and said card assembly further comprises a means for storing a second key code; said second key code being coupled, within said card body, to said generating means;

said generating means decrypts said encrypted control component in response to said second key code to generate a decrypted control component and generates said first mentioned key code in response to said decrypted control component.

11. A method for signal processing, said method comprising:

(a) receiving a digital input stream having a control component and a scrambled data component identified by respective header portions, said scrambled data component comprising at least one of audio and video data;

(b) coupling said input stream to a removable card assembly having a means for access control processing, said access control processing means generates a key code in response to said control component, descrambles said scrambled data component in response to said key code to generate a descrambled data component, processes said input stream by detecting said header portions of said components, separating said input stream into said components and routing said control component to said generating means and said scrambled data component to said descrambling means and couples, within said card body, said key code between said generating means and said descrambling means;

(c) receiving from said card assembly a processed input stream having said control component and said descrambled data component; and (d) processing said descrambled data component to generate an output stream.

12. The method of claim 11 wherein:

said control component is encrypted and further comprising the steps of decrypting said control component in response to a second key code stored within said card body to generate a decrypted control component and generating said first mentioned key code in response to said decrypted control component.

* * * * *